United States Patent
Oguni et al.

(10) Patent No.: US 12,469,163 B2
(45) Date of Patent: Nov. 11, 2025

(54) POSITION ESTIMATION SYSTEM, POSITION ESTIMATION DEVICE, AND MOBILE OBJECT

(71) Applicant: SEMICONDUCTOR ENERGY LABORATORY CO., LTD., Atsugi (JP)

(72) Inventors: Teppei Oguni, Kanagawa (JP); Yusuke Koumura, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 463 days.

(21) Appl. No.: 17/913,340

(22) PCT Filed: Mar. 29, 2021

(86) PCT No.: PCT/IB2021/052560
§ 371 (c)(1),
(2) Date: Sep. 21, 2022

(87) PCT Pub. No.: WO2021/205276
PCT Pub. Date: Oct. 14, 2021

(65) Prior Publication Data
US 2023/0145777 A1 May 11, 2023

(30) Foreign Application Priority Data
Apr. 10, 2020 (JP) ................. 2020-071120

(51) Int. Cl.
G06T 7/70 (2017.01)
G06T 7/246 (2017.01)
(Continued)

(52) U.S. Cl.
CPC ............... *G06T 7/70* (2017.01); *G06T 7/248* (2017.01); *G06V 10/751* (2022.01);
(Continued)

(58) Field of Classification Search
CPC . G06T 7/70; G06T 7/248; G06T 2207/20081; G06T 2207/20084;
(Continued)

(56) References Cited

U.S. PATENT DOCUMENTS 10,948,302 B2 3/2021 Kudrynski et al.
10,949,595 B2 3/2021 Tsutsui et al.
(Continued)

FOREIGN PATENT DOCUMENTS

JP 2016-024598 A 2/2016
JP 2016-110576 A 6/2016
(Continued)

OTHER PUBLICATIONS

Opromolla R, Fasano G, Rufino G, Grassi M. A Model-Based 3D Template Matching Technique for Pose Acquisition of an Uncooperative Space Object. Sensors. 2015; 15(3):6360-6382. https://doi.org/10.3390/s150306360 (Year: 2015).*
(Continued)

*Primary Examiner* — Stephen R Koziol
(74) *Attorney, Agent, or Firm* — NIXON PEABODY LLP; Jeffrey L. Costellia

(57) ABSTRACT

A position estimation system with low power consumption is provided. The position estimation system includes a comparison unit, a learning unit, a data acquisition unit, an inference unit, a data conversion unit, and an evaluation unit. The comparison unit has a function of calculating a first parallel movement amount and a first rotation amount on the basis of machine learning data representing geographic information. The learning unit has a function of generating a machine learning model through learning using the machine learning data, the first parallel movement amount, and the first rotation amount. The data acquisition unit has a function of acquiring acquisition data representing envi-
(Continued)

ronmental information on the vicinity of a position estimation device. The inference unit has a function of inferring a second parallel movement amount and a second rotation amount, with use of the machine learning model, on the basis of the acquisition data and the machine learning data. The data conversion unit has a function of converting the machine learning data to evaluation data on the basis of the second parallel movement amount and the second rotation amount. The evaluation unit has a function of evaluating the degree of correspondence between the acquisition data and the evaluation data.

10 Claims, 8 Drawing Sheets

(51) Int. Cl.
*G06V 10/75* (2022.01)
*G06V 10/771* (2022.01)
*G06V 10/776* (2022.01)
*G06V 10/82* (2022.01)

(52) U.S. Cl.
CPC .......... *G06V 10/771* (2022.01); *G06V 10/776* (2022.01); *G06V 10/82* (2022.01)

(58) Field of Classification Search
CPC .... G06T 17/05; G06V 10/751; G06V 10/771; G06V 10/776; G06V 10/82; G06V 10/778; G06V 10/803; G06V 20/10; G06N 3/04; G06N 3/045; G06N 3/08; G06N 20/00; G08G 1/0112; G08G 1/0129; G08G 1/0145; G01C 21/28; G01C 21/3848; G01C 21/3863; G01C 21/3885
See application file for complete search history.

(56) References Cited

U.S. PATENT DOCUMENTS

| | | | |
|---|---|---|---|
| 11,062,475 B2 | 7/2021 | Nakashima et al. | |
| 11,137,255 B2 | 10/2021 | Kudrynski et al. | |
| 11,274,928 B2 | 3/2022 | Kudrynski et al. | |
| 11,287,264 B2 | 3/2022 | Kudrynski et al. | |
| 2017/0336515 A1* | 11/2017 | Hosoya | G01C 21/28 |
| 2019/0311272 A1 | 10/2019 | Kamata et al. | |
| 2020/0029488 A1 | 1/2020 | Bertucci et al. | |
| 2020/0284581 A1* | 9/2020 | Zhang | G01C 11/30 |
| 2020/0333789 A1* | 10/2020 | Suzuki | G05D 1/0212 |
| 2022/0147682 A1 | 5/2022 | Koumura | |
| 2022/0245181 A1 | 8/2022 | Dozen et al. | |

FOREIGN PATENT DOCUMENTS

| | | |
|---|---|---|
| JP | 2018-533721 | 11/2018 |
| JP | 2019-125354 A | 7/2019 |
| JP | 2019-182093 A | 10/2019 |
| WO | WO-2019/138836 | 7/2019 |

OTHER PUBLICATIONS

Li Peiliang, Qin Tong, Shen Shaojie. Stereo Vision-based Semantic 3D Object and Ego-motion Tracking for Autonomous Driving. arXiv:1807.02062, https://doi.org/10.48550/arXiv.1807.02062 (Year: 2018).*

Nourzad Seyed Hossein Hosseini, Pradhan Anu. Binary and Multi-Class Classification of Fused LIDAR-Imagery Data Using an Ensemble Method. Construction Research Congress 2012: Construction Challenges in a Flat World. https://doi.org/10.1061/9780784412329.09 (Year: 2012).*

International Search Report (Application No. PCT/IB2021/052560) Dated Jun. 29, 2021.

Written Opinion (Application No. PCT/IB2021/052560) Dated Jun. 29, 2021.

* cited by examiner

POSITION ESTIMATION SYSTEM, POSITION ESTIMATION DEVICE, AND MOBILE OBJECT

TECHNICAL FIELD

One embodiment of the present invention relates to a position estimation system. Another embodiment of the present invention relates to a position estimation method. Another embodiment of the present invention relates to a position estimation device. Another embodiment of the present invention relates to a mobile object including a position estimation device.

BACKGROUND ART

Automated driving technology has attracted attention recently. Self-localization estimation technology is one example of automated driving technology. Patent Document 1 discloses a method of self-localization estimation, in which the surroundings of an automobile provided with a sensor is scanned with the sensor to acquire scan data in real time; and the self-localization is estimated on the basis of the acquired scan data.

PRIOR ART DOCUMENT

Patent Document

[Patent Document 1] Japanese Translation of PCT International Application No. 2018-533721

SUMMARY OF THE INVENTION

Problems to be Solved by the Invention

When the self-localization is acquired on the basis of the scan data, a huge quantity of arithmetic operation is required to estimate the self-localization in some cases. Thus, use of a high-performance arithmetic device is needed to acquire the self-localization in real time, which increases power consumption in some cases.

In view of the above, an object of one embodiment of the present invention is to provide a position estimation system capable of real-time position estimation. Another object of one embodiment of the present invention is to provide a position estimation system with low power consumption. Another object of one embodiment of the present invention is to provide an inexpensive position estimation system. Another object of one embodiment of the present invention is to provide a novel position estimation system. Another object of one embodiment of the present invention is to provide a position estimation method using the above position estimation system.

Another object of one embodiment of the present invention is to provide a position estimation device capable of real-time position estimation. Another object of one embodiment of the present invention is to provide a position estimation device with low power consumption. Another object of one embodiment of the present invention is to provide an inexpensive position estimation device. Another object of one embodiment of the present invention is to provide a novel position estimation device. Another object of one embodiment of the present invention is to provide a position estimation method using the above position estimation device.

Note that the description of these objects does not preclude the existence of other objects. One embodiment of the present invention does not have to achieve all these objects. Note that other objects will be apparent from the descriptions of the specification, the drawings, the claims, and the like, and other objects can be derived from the descriptions of the specification, the drawings, the claims, and the like.

Means for Solving the Problems

One embodiment of the present invention a position estimation system including a learning device and a position estimation device; the learning device includes a comparison unit and a learning unit; the position estimation device includes a data acquisition unit, an inference unit, a data conversion unit, and an evaluation unit; and the data acquisition unit includes a sensor. The comparison unit has a function of selecting two types of machine learning data from three or more types of machine learning data representing geographic information and a function of comparing the two types of machine learning data to calculate a first parallel movement amount and a first rotation amount. The learning unit has a function of generating a machine learning model through learning using the two types of machine learning data, the first parallel movement amount, and the first rotation amount. The data acquisition unit has a function of acquiring acquisition data with use of the sensor. The inference unit has a function of inferring a second parallel movement amount and a second rotation amount, with use of the machine learning model, on the basis of the acquisition data and one type of machine learning data selected from the three or more types of machine learning data. The data conversion unit has a function of converting the one type of machine learning data to evaluation data on the basis of the second parallel movement amount and the second rotation amount. The evaluation unit has a function of evaluating the degree of correspondence between the acquisition data and the evaluation data.

Another embodiment of the present invention is a position estimation system including a learning device and a position estimation device; the learning device includes a first point-cloud-to-image conversion unit, a comparison unit, and a learning unit; and the position estimation device includes a point cloud data acquisition unit, a second point-cloud-to-image conversion unit, an inference unit, a data conversion unit, and an evaluation unit. The first point-cloud-to-image conversion unit has a function of converting n (n is an integer greater than or equal to 3) types of machine learning point cloud data representing geographic information to n types of machine learning image data. The comparison unit has a function of selecting two types of machine learning point cloud data from then types of machine learning point cloud data and comparing the two types of machine learning point cloud data to calculate a first parallel movement amount and a first rotation amount. The learning unit has a function of generating a machine learning model through learning using two types of machine learning image data corresponding to the two types of machine learning point cloud data, the first parallel movement amount, and the first rotation amount. The point cloud data acquisition unit has a function of acquiring acquisition point cloud data. The second point-cloud-to-image conversion unit has a function of converting the acquisition point cloud data to acquisition image data. The inference unit has a function of inferring a second parallel movement amount and a second rotation amount, with use of the machine learning model, on the basis of the acquisition image data and one type of machine learning image data selected from the n types of machine learning image data. The data conversion unit has a function of converting one type of machine learning point cloud data corresponding to the one type of machine learning image data to evaluation point cloud data on the basis of the second parallel movement amount and the second rotation amount. The evaluation unit has a function of evaluating the degree of correspondence between the acquisition point cloud data and the evaluation point cloud data.

Alternatively, in the above embodiment, the acquisition image data and the machine learning image data may be binary data.

Alternatively, in the above embodiment, the machine learning model may be a convolutional neural network model.

Alternatively, in the above embodiment, the first parallel movement amount and the first rotation amount may be calculated by scan matching.

Another embodiment of the present invention is a position estimation device including a data acquisition unit, an inference unit, a data conversion unit, and an evaluation unit; the data acquisition unit includes a sensor. The data acquisition unit has a function of acquiring acquisition data with use of the sensor. The inference unit has a function of inferring a first parallel movement amount and a first rotation amount, with use of a machine learning model, on the basis of the acquisition data and one type of machine learning data selected from three or more types of machine learning data representing geographic information. The machine learning model is generated through learning using two types of machine learning data selected from the three or more types of machine learning data, and a second parallel movement amount and a second rotation amount which are calculated by comparing the two types of machine learning data. The data conversion unit has a function of converting one type of machine learning data to evaluation data on the basis of the first parallel movement amount and the first rotation amount. The evaluation unit has a function of evaluating the degree of correspondence between the acquisition data and the evaluation data.

Alternatively, in the above embodiment, the machine learning model may be a convolutional neural network model.

Alternatively, in the above embodiment, the second parallel movement amount and the second rotation amount may be calculated by scan matching.

A mobile object including the position estimation device of one embodiment of the present invention and a battery is also one embodiment of the present invention.

Alternatively, in the above embodiment, the mobile object may have a function of performing automated driving.

Effect of the Invention

According to one embodiment of the present invention, a position estimation system capable of real-time position estimation can be provided. According to another object of one embodiment of the present invention, a position estimation system with low power consumption can be provided. According to another embodiment of the present invention, an inexpensive position estimation system can be provided. According to another embodiment of the present invention, a novel position estimation system can be provided. According to another embodiment of the present invention, a position estimation method using the position estimation system can be provided.

According to another embodiment of the present invention, a position estimation device capable of real-time position estimation can be provided. According to another embodiment of the present invention, a position estimation device with low power consumption can be provided. According to another embodiment of the present invention, an inexpensive position estimation device can be provided. According to another embodiment of the present invention, a novel position estimation device can be provided. According to another embodiment of the present invention, a position estimation method using the position estimation device can be provided.

Note that the effects of one embodiment of the present invention are not limited to the effects listed above. The effects listed above do not preclude the existence of other effects. Note that the other effects are effects that are not described in this section and will be described below. The other effects that are not described in this section will be derived from the description of the specification, the drawings, and the like and can be extracted from the description by those skilled in the art. Note that one embodiment of the present invention is to have at least one of the effects listed above and/or the other effects. Accordingly, depending on the case, one embodiment of the present invention does not have the effects listed above in some cases.

MODE FOR CARRYING OUT THE INVENTION

Figure 1:
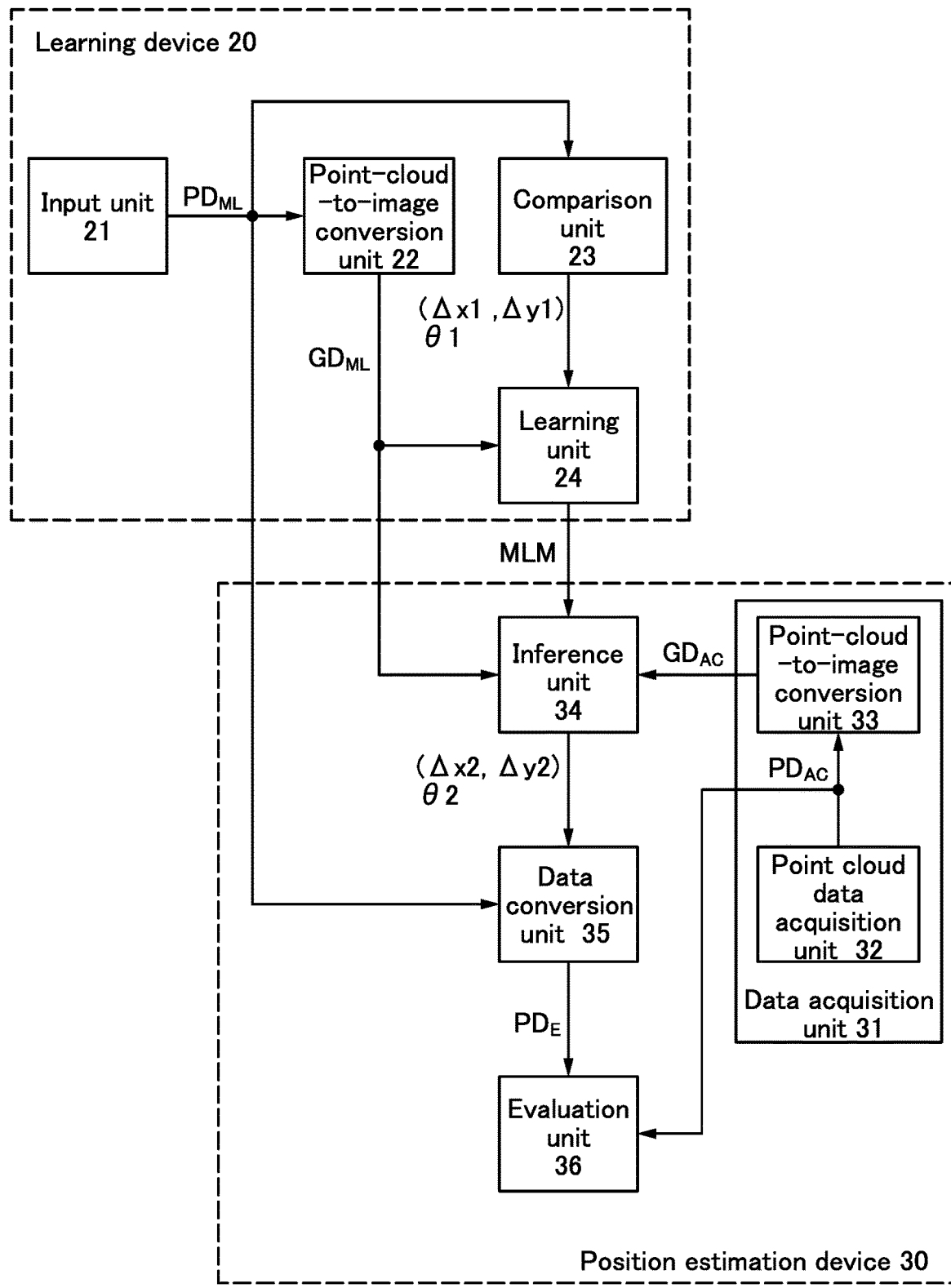
FIG. 1 is a block diagram illustrating a structure example of a position estimation system.

Embodiments will be described in detail with reference to the drawings. Note that the present invention is not limited to the following description, and it will be readily understood by those skilled in the art that modes and details of the present invention can be modified in various ways without departing from the spirit and scope of the present invention. Therefore, the present invention should not be construed as being limited to the description of embodiments below.

Note that the position, size, range, or the like of each component illustrated in drawings and the like is not accurately represented in some cases for easy understanding. Therefore, the disclosed invention is not necessarily limited to the position, size, range, or the like disclosed in the drawings.

Ordinal numbers such as "first", "second", and "third" used in this specification are used in order to avoid confusion among components and do not limit the components numerically.

Embodiment

In this embodiment, a position estimation system, a position estimation method using the position estimation system, and the like, of one embodiment of the present invention will be described with reference to drawings.

Structure Example of Position Estimation System

FIG. 1 is a block diagram illustrating a structure example of a position estimation system 10. The position estimation system 10 includes a learning device 20 and a position estimation device 30. Note that it is preferable to provide the learning device 20 in a device having a high arithmetic capacity such as a server. The learning device 20 and the position estimation device 30 exchange data or the like with each other via a network or the like.

The learning device 20 includes an input unit 21, a point-cloud-to-image conversion unit 22, a comparison unit 23, and a learning unit 24. The position estimation device 30 includes a data acquisition unit 31, an inference unit 34, a data conversion unit 35, and an evaluation unit 36. Here, the data acquisition unit 31 includes a point cloud data acquisition unit 32 and a point-cloud-to-image conversion unit 33. Although not illustrated in FIG. 1, for example, a memory unit can be provided in the learning device 20 and the position estimation device 30. The memory unit can store data, a program, and the like used for driving the position estimation system 10, and each component of the position estimation system 10 can read out them as necessary.

In FIG. 1, data exchange between the components of the position estimation system 10 is shown by arrows. Note that the data exchange shown in FIG. 1 is an example, and data or the like can be sometimes exchanged between components that are not connected by an arrow, for example. Furthermore, data is not exchanged between components that are connected by an arrow in some cases.

First, the learning device 20 is described. The input unit 21 has a function of an interface, to which machine learning point cloud data $PD_{ML}$ is input. In one embodiment of the present invention, n (n is an integer greater than or equal to 3) types of machine learning point cloud data $PD_{ML}$ is input to the input unit 21. The machine learning point cloud data $PD_{ML}$ can be, for example, point cloud data that is acquired by a device outside the position estimation system 10 and stored in a database. Thus, the machine learning point cloud data can be referred to as database point cloud data.

The machine learning point cloud data $PD_{ML}$ can be acquired by a device including a laser and a sensor, for example. Specifically, laser light is incident, for example, and the sensor detects scattered laser light, whereby the machine learning point cloud data $PD_{ML}$ can be acquired. In other words, the machine learning point cloud data $PD_{ML}$ can be acquired with, for example, LiDAR (Light Detection And Ranging). The acquired machine learning point cloud data $PD_{ML}$ represents geographic information and can include information indicating a location on the map. That is, the machine learning point cloud data $PD_{ML}$ can be referred to as data representing geographic information including position information. The machine learning point cloud data $PD_{ML}$ can be supplied to the point-cloud-to-image conversion unit 22, the comparison unit 23, and the data conversion unit 35.

The point-cloud-to-image conversion unit 22 has a function of converting point cloud data to image data. Specifically, its function is to convert the machine learning point cloud data $PD_{ML}$ to machine learning image data $GD_{ML}$. For example, the point-cloud-to-image conversion unit 22 has a function of converting the machine learning point cloud data $PD_{ML}$ to binary machine learning image data $GD_{ML}$, in which a coordinate including a point corresponds to "1" and a coordinate not including a point corresponds to "0". As described above, the machine learning point cloud data can be referred to as database point cloud data. Therefore, the machine learning image data can be referred to as database image data.

As described above, the machine learning point cloud data $PD_{ML}$ represents geographic information, and the machine learning image data $GD_{ML}$ is a result of converting the machine learning point cloud data $PD_{ML}$. Thus, the machine learning point cloud data $PD_{ML}$ and the machine learning image data $GD_{ML}$ can be referred to as geographic data.

The comparison unit 23 has a function of extracting two types of machine learning point cloud data $PD_{ML}$ from the machine learning point cloud data $PD_{ML}$ input to the input unit 21 and comparing them, thereby calculating a parallel movement amount and a rotation amount. For example, when the machine learning point cloud data $PD_{ML}$ is denoted by a two-dimensional coordinate system (xy coordinate system), the comparison unit 23 can calculate a movement amount $\Delta x1$ in the x-axis direction and a movement amount $\Delta y1$ in the y-axis direction as a parallel movement amount. In addition, the comparison unit 23 can calculate a rotation amount $\theta1$.

Description is made below on the assumption that the point cloud data and image data are each denoted by a two-dimensional coordinate system; however, the following description can be also referred to even when the point cloud data and the image data are each denoted by a three-dimensional coordinate system owing to an increase in the dimension numbers of the parallel movement amount and the rotation amount or the like. For example, in the case where the point cloud data and the image data are each denoted by a three-dimensional coordinate system, the parallel movement amount can be denoted by a three-dimensional vector. Furthermore, the rotation amount can be denoted by a rotation vector, a rotation matrix, Euler angles, quaternion, or the like. Note that in the case where the point cloud data and the image data are each denoted by a three-dimensional coordinate system, the point cloud data and the image data can be three-dimensional array data.

In this specification and the like, the point cloud data is denoted by a two-dimensional coordinate system such that the movement amount in the x-axis direction is $\Delta x$ and the movement amount in the y-axis direction is $\Delta y$, in which case the parallel movement amount is denoted by $(\Delta x, \Delta y)$.

The parallel movement amount $(\Delta x1, \Delta y1)$ and the rotation amount $\theta1$ are calculated by scan matching, e.g., ICP (Iterative Closest Point) scan matching or NDT (Normal Distribution Transform) scan matching. The parallel movement amount $(\Delta x1, \Delta y1)$ and the rotation amount $\theta1$ can be calculated so that the two types of the machine learning point cloud data $GD_{ML}$, which are compared, have the highest correspondence degree.

The learning unit 24 has a function of generating a machine learning model MLM. As the machine learning model MLM, for example, a multilayer perceptron, a support vector machine, a neural network model, or the like can be employed. In particular, a convolutional neural network (CNN) is preferably employed as the machine learning model MLM.

The learning unit 24 has a function of performing learning using the machine learning image data $GD_{ML}$, the parallel movement amount $(\Delta x1, \Delta y1)$, and the rotation amount $\theta1$ to generate the machine learning model MLM. The machine learning model MLM can be generated with supervised learning, for example. For example, two types of machine learning image data $GD_{ML}$ corresponding to the two types of machine learning point cloud data $PD_{ML}$, which are compared by the comparison unit 23, are used as learning data, to which the parallel movement amount ($\Delta x1$, $\Delta y1$) and the rotation amount $\theta 1$ are linked as correction labels, and the learning is performed, whereby the machine learning model MLM can be generated.

The above is the description of the learning device 20.

Next, the position estimation device 30 is described. The data acquisition unit 31 has a function of acquiring data. The data acquisition unit 31 has a function, for example, of acquiring acquisition point cloud data $PD_{AC}$ and acquisition image data $GD_{AC}$. The acquisition image data $GD_{AC}$ can be acquired by converting the acquisition point cloud data $PD_{AC}$ to image data, for example; the details are described later.

Data acquired by the data acquisition unit 31 can be supplied to the inference unit 34 and the evaluation unit 36. The data acquisition unit 31 can supply the acquisition point cloud data $PD_{AC}$ to, for example, the evaluation unit 36 and can supply the acquisition image data $GD_{AC}$ to, for example, the inference unit 34.

The point cloud data acquisition unit 32 has a function of acquiring the acquisition point cloud data $PD_{AC}$. The point cloud data acquisition unit 32 includes a laser and a sensor, for example. The vicinity of the position estimation device 30 is irradiated with the laser, and the scattered laser light is detected by the sensor, so that the acquisition point cloud data $PD_{AC}$ can be acquired. In other words, the point cloud data acquisition unit 32 can acquire the acquisition point cloud data $PD_{AC}$ representing environmental information on the vicinity of the position estimation device 30 with LiDAR, for example.

The point-cloud-to-image conversion unit 33 has a function of converting the point cloud data to image data. Specifically, the point-cloud-to-image conversion unit 33 has a function of converting the acquisition point cloud data $PD_{AC}$ to the acquisition image data $GD_{AC}$. The function of converting the point cloud data to the image data by the point-cloud-to-image conversion unit 33 is a manner similar to that by the point-cloud-to-image conversion unit 22.

The function by the point-cloud-to-image conversion unit 33 is specifically to convert the acquisition point cloud data $PD_{AC}$ to binary acquisition image data $GD_{AC}$ in which a coordinate including a point corresponds to "1" and a coordinate not including a point corresponds to "0", for example.

The inference unit 34 has a function of performing inference based on the machine learning model MLM. Specifically, when the acquisition image data $GD_{AC}$ and one type of the machine learning image data $GD_{ML}$ are input to the inference unit 34, the inference unit 34 has a function of inferring a parallel movement amount ($\Delta x2$, $\Delta y2$) and a rotation amount $\theta 2$ on the basis of the machine learning model MLM.

The data conversion unit 35 has a function of converting the machine learning point cloud data $PD_{ML}$ corresponding to the machine learning image data $GD_{ML}$ input to the inference unit 34 to evaluation point cloud data $PD_E$ on the basis of the parallel movement amount ($\Delta x2$, $\Delta y2$) and the rotation amount $\theta 2$. The function by the data conversion unit 35 is specifically to move each point in the machine learning point cloud data $PD_{ML}$ corresponding to the machine learning image data $GD_{ML}$ input to the inference unit 34 in parallel by ($\Delta x2$, $\Delta y2$) and rotate the point by $\theta 2$, whereby the machine learning point cloud data $PD_{ML}$ is converted to the evaluation point cloud data $PD_E$.

The evaluation unit 36 has a function of calculating an evaluation value representing the degree of correspondence between the acquisition point cloud data $PD_{AC}$ and the evaluation point cloud data $PD_E$. The evaluation value can be calculated by a method used in scan matching such as ICP scan matching or NDT scan matching. For example, the calculation of the distance between a point included in the acquisition point cloud data $PD_{AC}$ and a corresponding point in the evaluation point cloud data $PD_E$ or the squared value of the distance is performed on each point. The sum of distances or the sum of squared values of the distances are regarded as the evaluation value. In this case, a smaller evaluation value indicates a higher degree of correspondence between the acquisition point cloud data $PD_{AC}$ and the evaluation point cloud data $PD_E$.

The low degree of correspondence between the acquisition point cloud data $PD_{AC}$ and the evaluation point cloud data $PD_E$ suggests that the position estimation device 30 exists far from a location represented by the evaluation point cloud data $PD_E$. By contrast, the high degree of correspondence between the acquisition point cloud data $PD_{AC}$ and the evaluation point cloud data $PD_E$ suggests the position estimation device 30 exists close to a location represented by the evaluation point cloud data $PD_E$. As described above, the degree of the correspondence between the acquisition point cloud data $PD_{AC}$ and the evaluation point cloud data $PD_E$ is evaluated, whereby the position of the position estimation device 30 can be estimated.

The above is the structure example of the position estimation system 10. The position estimation system 10 can calculate the parallel movement amount ($\Delta x2$, $\Delta y2$) and the rotation amount $\theta 2$ from the inference based on the machine learning model MLM. Thus, the quantity of arithmetic operation by the position estimation device 30 can be reduced as compared to the case where the parallel movement amount ($\Delta x2$, $\Delta y2$) and the rotation amount $\theta 2$ are calculated without using a machine learning model. Consequently, both real-time position estimation of the position estimation device 30 and a reduction in power consumption of the position estimation device 30 can be achieved. Furthermore, a CPU (Central Processing Unit), a GPU (Graphic Processing Unit), or the like in the position estimation device 30 does not need to have higher performance, which result in the position estimation device 30 to be inexpensive.

Figure 2:
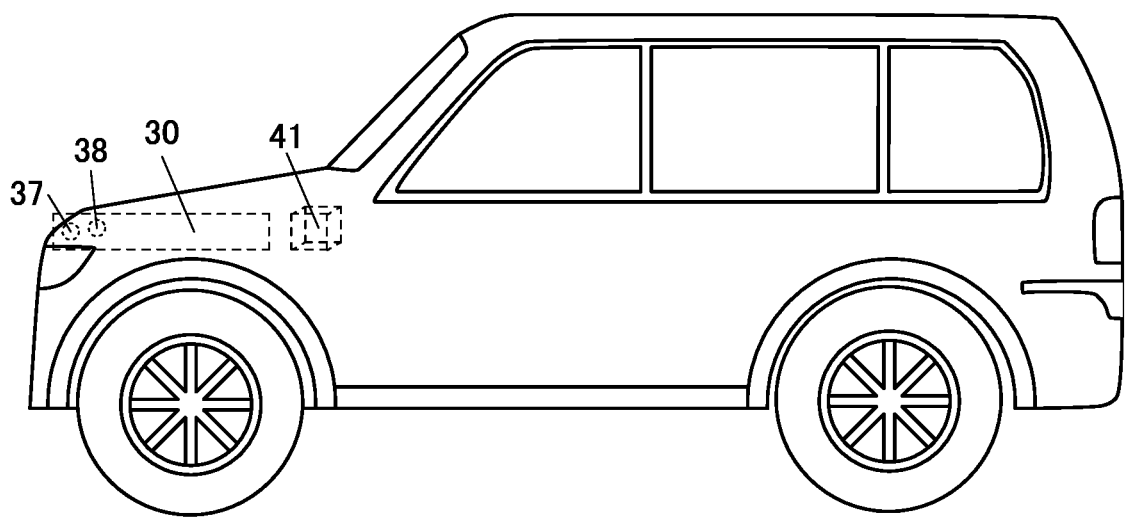
FIG. 2 illustrates an example of a mobile object.

The position estimation device 30 can be adopted in a mobile object, for example. Example of mobile objects includes an automobile. FIG. 2 illustrates an automobile 40 as an example of a mobile object. As described above, in the point cloud data acquisition unit 32 included in the position estimation device 30, a laser and a sensor can be provided. FIG. 2 illustrates a structure example of the automobile 40 including a laser 37 and a sensor 38.

In addition, the automobile 40 is provided with a battery 41. The battery 41 can supply the power needed for driving the position estimation device 30.

Application of the position estimation device 30 to the mobile object enables real-time estimation of the position of the mobile object. Thus, the mobile object with the position estimation device 30 can have a self-driving function. As described above, the position estimation device 30 consumes a small amount of power. This means that even when the mobile objects has a self-driving function with use of the position estimation device 30, the mobile object can inhibit a significant increase in power consumption as compared with a mobile object having no self-driving function. Specifically, a significant increase in power consumption by the battery included in the mobile object can be inhibited.

In the position estimation system 10, as described above, the machine learning point cloud data $PD_{ML}$ is converted to the machine learning image data $GD_{ML}$ and then supplied to the learning unit 24 and the inference unit 34. Furthermore, the acquisition point cloud data $PD_{AC}$ is converted to the acquisition image data $GD_{AC}$ and then supplied to the inference unit 34. In other words, in the position estimation system 10, the point could data is converted to the image data, and machine learning is performed with the image data. In this process, the machine learning model MLM can be a CNN, for example. Note that the machine learning may be performed with the point cloud data that is not being converted to the image data.

Figure 3:
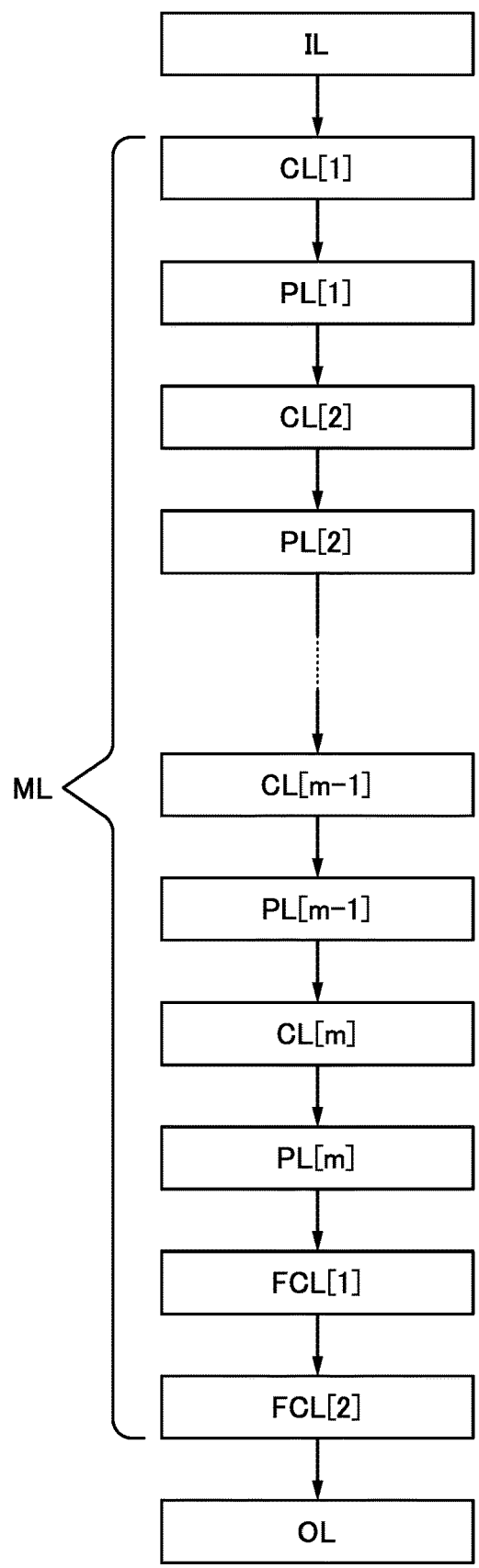
FIG. 3 is a diagram showing an example of a machine learning model.

FIG. 3 illustrates a CNN which can be employed for the machine learning model MLM. The machine learning model MLM using the CNN includes an input layer IL, an intermediate layer ML, and an output layer OL. The intermediate layer ML includes a convolutional layer CL, a pooling layer PL and, a fully connected layer FCL. An example shown in FIG. 3 is such that the machine learning model MLM includes m (m is an integer greater than or equal to 1) convolutional layers CL, m pooling layers PL, and two fully connected layers FCL. Note that the machine learning model MLM may include only one fully connected layer FCL or three or more fully connected layers FCL.

In this specification and the like, a plurality of layers of the same type, a plurality of pieces of data of the same type, and the like are denoted by [1], [2], [m], and the like to be distinguished from each other. For example, m convolutional layers CL are denoted by a convolutional layer CL[1] to a convolutional layer CL[m] to be distinguished from each other.

The convolutional layer CL has a function of performing convolution on data input to the convolutional layer CL. The convolutional layer CL[1] has a function of performing convolution on data input to the input layer IL, for example. A convolutional layer CL[2] has a function of performing convolution on data output from a pooling layer PL[1]. The convolutional layer CL[m] has a function of performing convolution on data output from a pooling layer PL[m−1].

Convolution is performed by repetition of product-sum operation of the data input to the convolutional layer CL and a weight filter. Through the convolution in the convolutional layer CL, extraction or the like of a feature value with respect to the data input to the machine learning model MLM is performed.

The data subjected to the convolution is converted using an activation function, and then output to the pooling layer PL. As the activation function, ReLU (Rectified Linear Units) or the like can be used. A ReLU is a function that outputs "0" when an input value is negative and outputs the input value as it is when the input value is greater than or equal to "0". As the activation function, a sigmoid function, a tanh function, or the like can be used as well.

The pooling layer PL has a function of performing pooling on the data input from the convolutional layer CL. Pooling is processing in which the data is partitioned into a plurality of regions, and predetermined data is extracted from each of the regions and arranged in a matrix. By the pooling, the size of the data can be reduced while the features extracted by the convolutional layer CL remain. Robustness for a minute difference of the input data can be increased. Note that as the pooling, max pooling, average pooling, Lp pooling, or the like can be used.

The fully connected layer FCL has a function of connecting input data, converting the connected data by an activation function, and outputting the converted data. As the activation function, a ReLU, a sigmoid function, a tanh function, or the like can be used.

Note that the configuration of the machine learning model MLM employing the CNN is not limited to that in FIG. 3. For example, one pooling layer PL may be provided for a plurality of convolutional layers CL. In other words, the number of pooling layers PL included in the machine learning model MLM may be smaller than the number of the convolutional layers CL. In the case where the position information of the extracted feature is desired to be left as much as possible, the pooling layer PL may be omitted.

Learning is performed with the machine learning model MLM using the CNN, whereby a filter value of the weight filter, a weight coefficient of the fully connected layer FCL, and the like can be optimized.

Example of Position Estimation Method

An example of the position estimation method using the position estimation system 10 will be described below. Specifically, an example of a method for generating the machine learning model MLM by the learning device 20 and an example of the position estimation method by the position estimation device 30 using the machine learning model MLM are described. The position of the position estimation device 30 can be estimated, for example, by a method described below.

Example of Method for Generating Machine Learning Model

Figure 4:
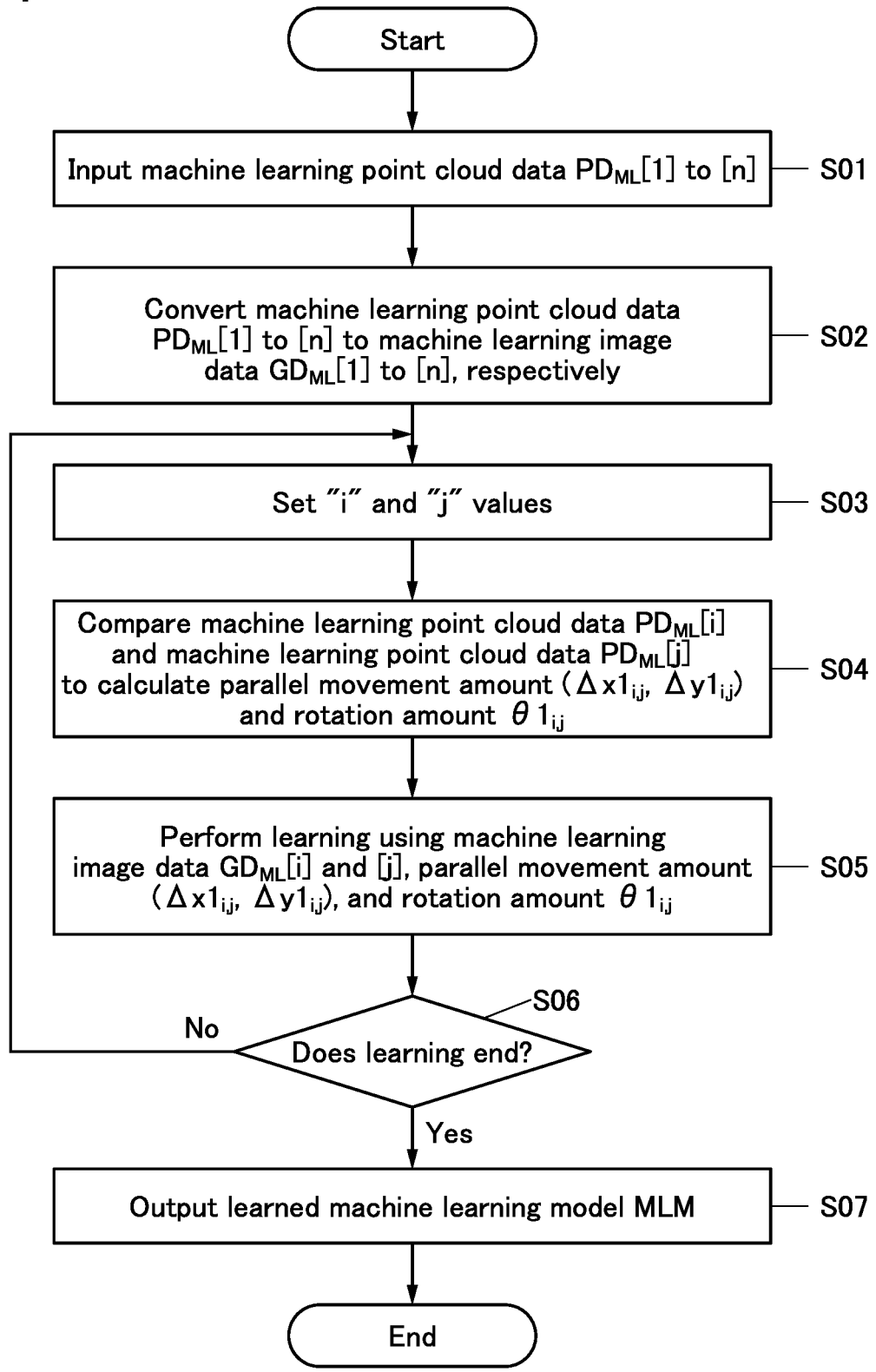
FIG. 4 is a flowchart showing an example of a position estimation method.

FIG. 4 is a flowchart showing an example of a method for generating the machine learning model MLM. As shown in FIG. 4, the machine learning model MLM is generated by a method shown by Step S01 to Step S07.

In order to generate the machine learning model MLM, first, machine learning point cloud data $PD_{ML}[1]$ to machine learning point cloud data $PD_{ML}[n]$ are input to the input unit 21 (Step S01). As described above, the machine learning point cloud data $PD_{ML}$ can be point cloud data representing geographic information including position information acquired with LiDAR or the like.

Figure 5:
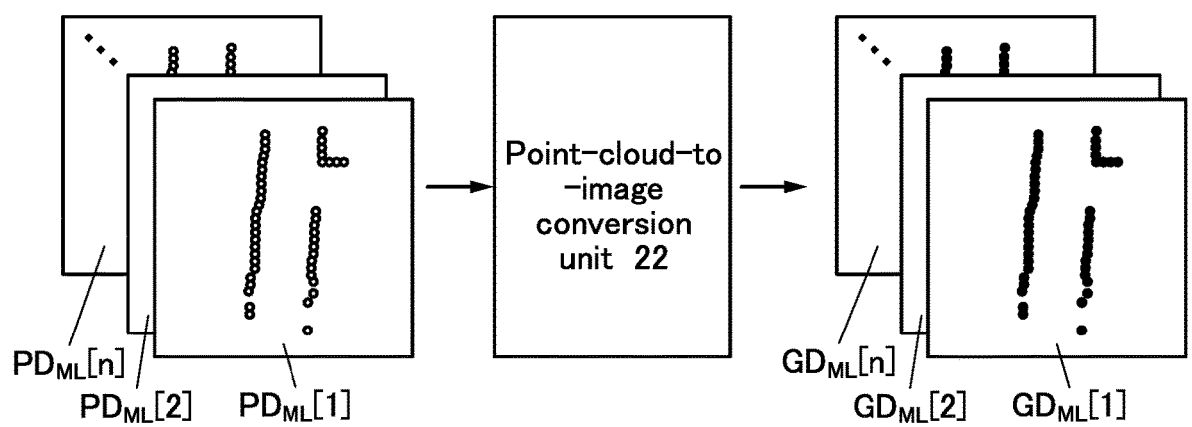
FIG. 5 is a schematic view illustrating an example of a position estimation method.

Next, the point-cloud-to-image conversion unit 22 converts the machine learning point cloud data $PD_{ML}[1]$ to the machine learning point cloud data $PD_{ML}[n]$ to machine learning image data $GD_{ML}[1]$ to machine learning image data $GD_{ML}[n]$, respectively (Step S02). FIG. 5 is a schematic view showing an example of the operation in Step S02.

In Step S02, the point-cloud-to-image conversion unit 22 converts the machine learning point cloud data $PD_{ML}[1]$ to the machine learning point cloud data $PD_{ML}[n]$ to binary machine learning image data $GD_{ML}[1]$ to binary machine learning image data $GD_{ML}[n]$, for example, in each of which a coordinate including a point is "1" and a coordinate not including a point is "0". FIG. 5 shows an example in which the machine learning point cloud data $PD_{ML}[1]$ to the machine learning point cloud data $PD_{ML}[n]$ are respectively converted to binary machine learning image data $GD_{ML}[1]$ to binary machine learning image data $GD_{ML}[n]$ in each of which a coordinate including a point is black and a coordinate not including a point is a white.

Figure 6A:
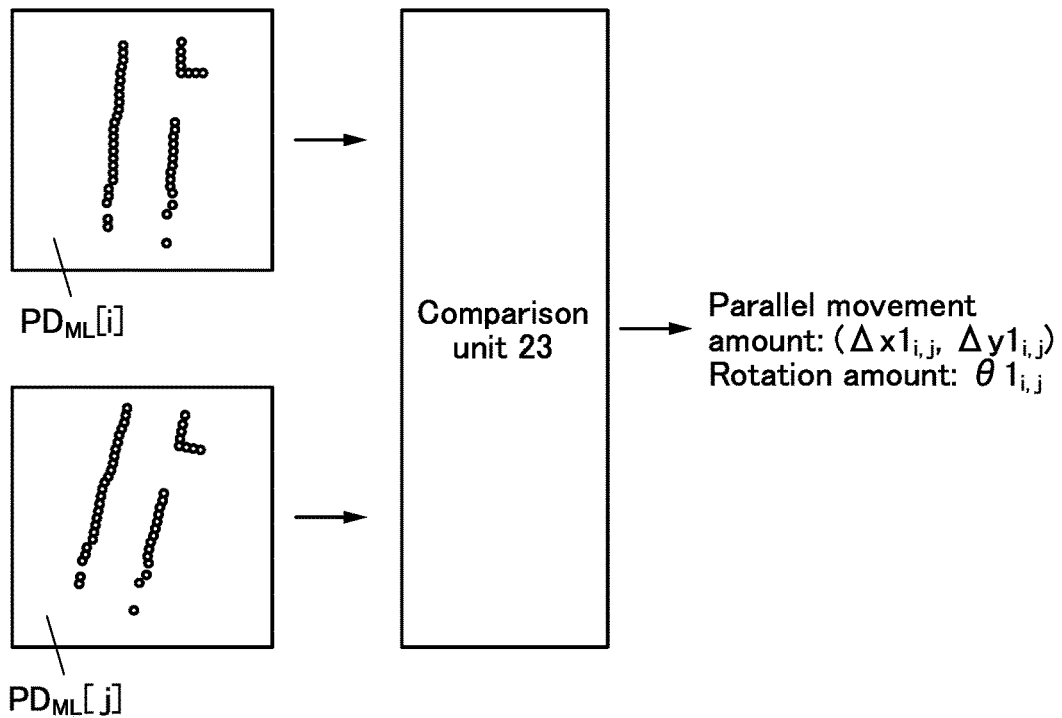
FIG. 6A and FIG. 6B are schematic views illustrating examples of a position estimation method.

Next, the comparison unit 23 sets values of "i" and "j" (Step S03). After that, machine learning point cloud data $PD_{ML}[i]$ and machine learning point cloud data $PD_{ML}[j]$ are compared, and a parallel movement amount $(\Delta x1_{i,j}, \Delta y1_{i,j})$ and a rotation amount $\theta 1_{i,j}$ are calculated (Step S04). FIG. 6A is a schematic view showing an example of the operation in Step S04. Here, i and j are each an integer greater than or equal to 1 and less than or equal to n. Furthermore, i and j are values different from each other. It is preferable that the machine learning point cloud data $PD_{ML}[i]$ and the machine learning point cloud data $PD_{ML}[j]$ represent positions close to each other. Specifically, it is preferable that the position represented by the machine learning point cloud data $PD_{ML}[i]$ be partly included in the machine learning point cloud data $PD_{ML}[j]$. Note that in Step S03, a plurality of values may be set at once for each of "i" and "j".

As described above, the parallel movement amount $(\Delta x1_{i,j}, \Delta y1_{i,j})$ and the rotation amount $\theta 1_{i,j}$ can be calculated by scan matching, for example, ICP scan matching or NDT scan matching. The parallel movement amount $(\Delta x1_{i,j}, \Delta y1_{i,j})$ and the rotation amount $\theta_{i,j}$ can be calculated so that the degree of the correspondence between the machine learning point cloud data $PD_{ML}[i]$ and the machine learning point cloud data $PD_{ML}[j]$ comes to be highest, for example.

Figure 6B:
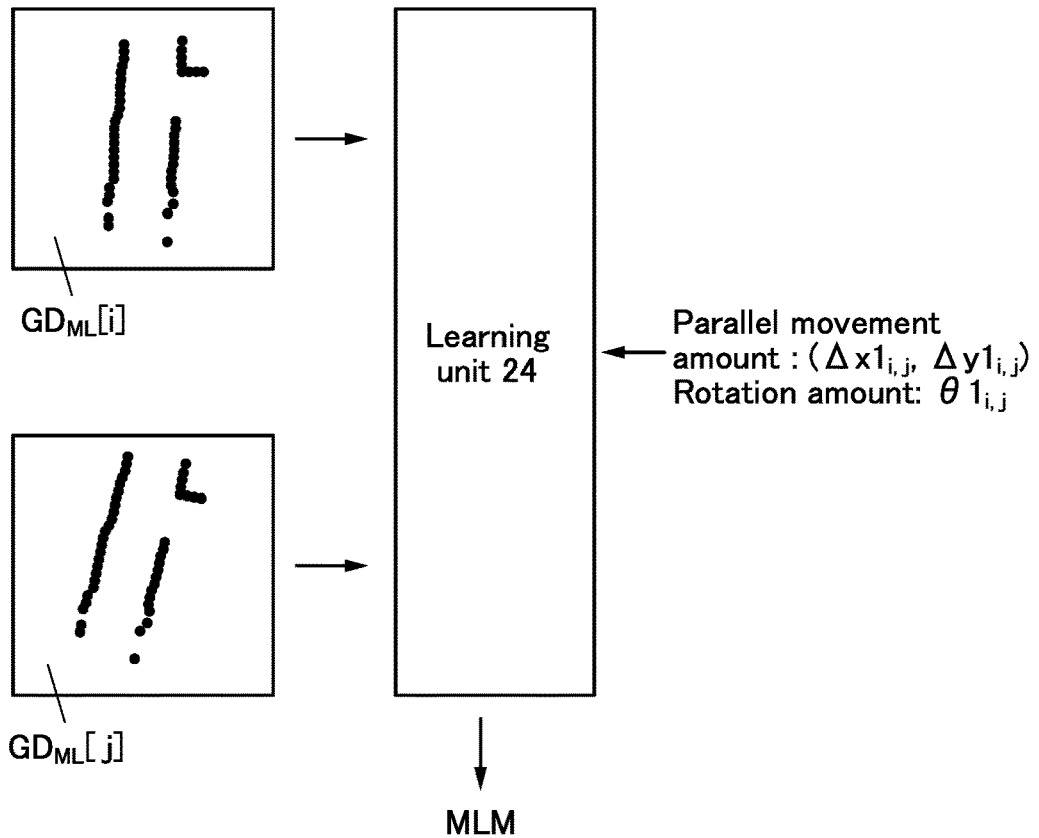

After that, the learning unit 24 performs learning using the machine learning image data $GD_{ML}[i]$, the machine learning image data $GD_{ML}[j]$, the parallel movement amount $(\Delta x1_{i,j}, \Delta y1_{i,j})$, and the rotation amount $\theta 1_{i,j}$ (Step 505). Accordingly, the learning unit 24 can generate the machine learning model MLM. FIG. 6B is a schematic view showing an example of the operation in Step 505.

In this specification and the like, for example, the image data converted from the machine learning point cloud data $PD_{ML}[i]$ is the machine learning image data $GD_{ML}[i]$, and image data converted from the machine learning point cloud data $PD_{ML}[j]$ is the machine learning image data $GD_{ML}[j]$. Furthermore, the machine learning point cloud data $PD_{ML}[i]$ and the machine learning image data $GD_{ML}[i]$ are data corresponding to each other, for example. Also, the machine learning point cloud data $PD_{ML}[j]$ and the machine learning image data $GD_{ML}[j]$ are data corresponding to each other. The same applies to the case where other pieces of point cloud data is converted to image data.

The above learning can be regarded, for example, as supervised learning as described. For example, learning is performed in a manner such that the machine learning image data $GD_{ML}[i]$ and the machine learning image data $GD_{ML}[j]$ are used as learning data, and the parallel movement amount $(\Delta x1_{i,j}, \Delta y1_{i,j})$ and the rotation amount $\theta 1_{i,j}$ are linked as correct labels to the leaning data; as a result, the learning unit 24 can generate the machine learning model MLM.

Next, whether the learning ends or not is determined (Step S06). The learning may end at the time when a predetermined number of times of learning is done. Alternatively, test may be performed using test data, and at the time when the machine learning model MLM is able to output the parallel movement amount $(\Delta x1_{i,j}, \Delta y1_{i,j})$ and the rotation amount $\theta 1_{i,j}$ correctly (i.e., when the output value of a loss function is lower than or equal to the threshold value), the learning may end. Alternatively, the learning may end at the time when the output value of a loss function is saturated to some extent. Alternatively, a user may specify the timing when the learning ends.

In the case where the learning does not end, the operation shown in Step S03 to Step S06 is performed again. In other words, one or both of "i" and "j" are reset to different values, whereby learning is performed.

In the case where the learning ends, the learning unit 24 outputs the machine learning model MLM on which the learning has been performed (Step S07). The learned machine learning model MLM is supplied to the position estimation device 30. Specifically, the learned machine learning model MLM is supplied to the inference unit 34 included in the position estimation device 30.

The above is an example of a method for generating the machine learning model MLM.

Example of Position Estimation Method

Figure 7:
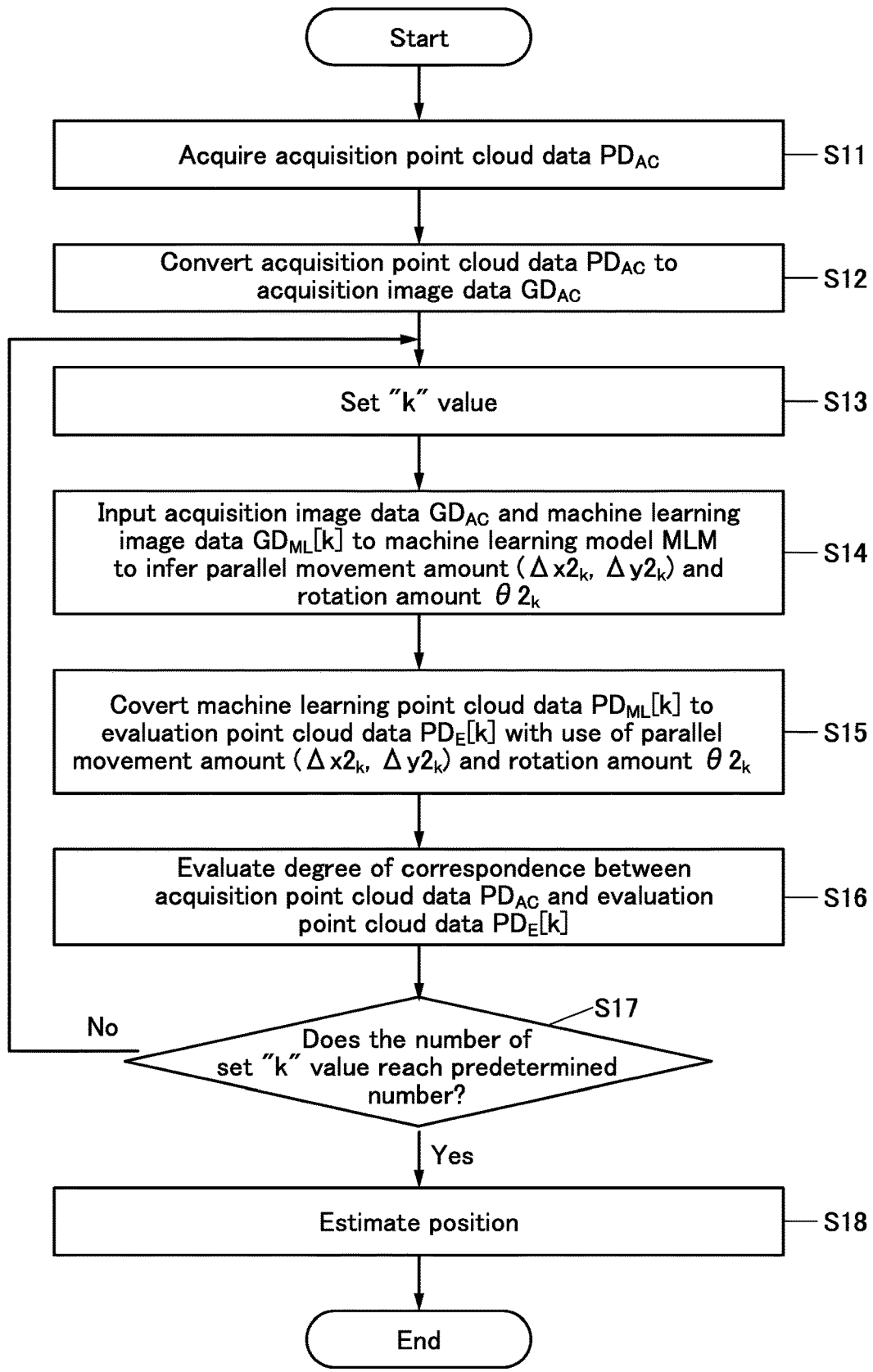
FIG. 7 is a flow chart showing an example of a position estimation method.

FIG. 7 is a flowchart showing an example of a position estimation method using the machine learning model MLM. The position of the position estimation device 30 is estimated by a method shown by Step S11 to Step S18 as shown in FIG. 7.

In order to estimate the position, first, the point cloud data acquisition unit 32 acquires the acquisition point cloud data $PD_{AC}$ representing environmental information on the vicinity of the position estimation device 30 (Step S11). As described above, the point cloud data acquisition unit 32 can acquire the acquisition point cloud data $PD_{AC}$ with LiDAR.

Next, the point-cloud-to-image conversion unit 33 converts the acquisition point cloud data $PD_{AC}$ to the acquisition image data $GD_{AC}$ (Step S12). For example, with a method similar to the method shown in FIG. 5, the point-cloud-to-image conversion unit 33 can convert the acquisition point cloud data $PD_{AC}$ to the acquisition image data $GD_{AC}$. Specifically, the point-cloud-to-image conversion unit 33 can convert the acquisition point cloud data $PD_{AC}$ to binary acquisition image data $GD_{AC}$ in which a coordinate including a point is "1" and a coordinate not including a point is "0".

Figure 8A:
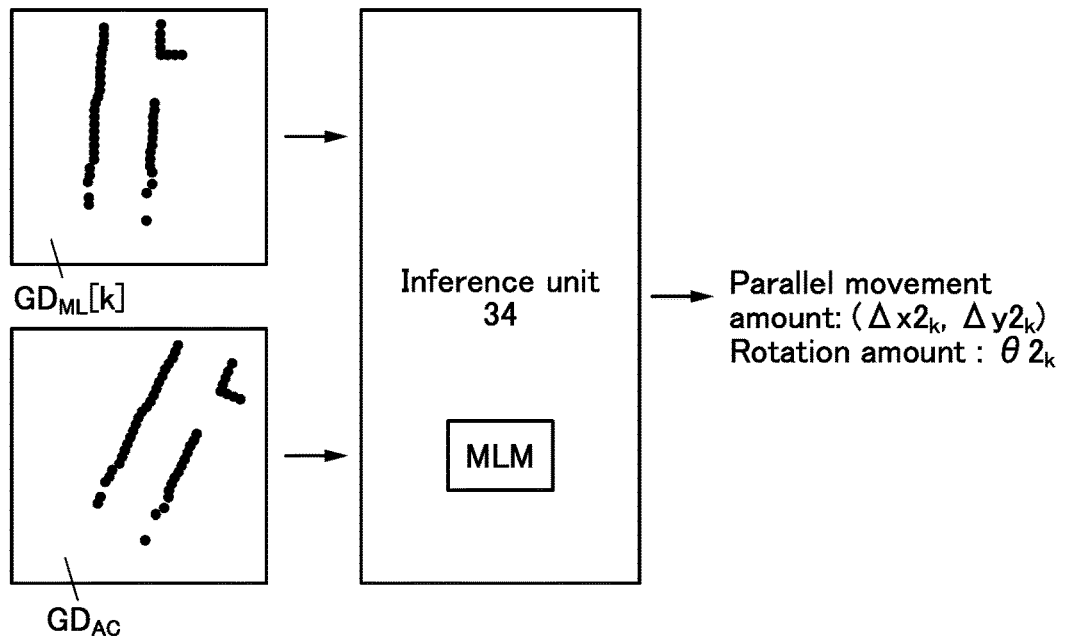
FIG. 8A and FIG. 8B are schematic views illustrating an example of a position estimation method.

After that, the inference unit 34 sets a value of "k" (Step S13) and inputs the acquisition image data $GD_{AC}$ and machine learning image data $GD_{ML}[k]$ to the machine learning model MLM built in the inference unit 34. Accordingly, a parallel amount $(\Delta x2_k, \Delta y2_k)$ and the rotation amount $\theta 2_k$ are inferred (Step S14). FIG. 8A is a schematic view showing an example of the operation in Step S14. Here, k is an integer greater than or equal to 1 and less than or equal to n.

Figure 8B:
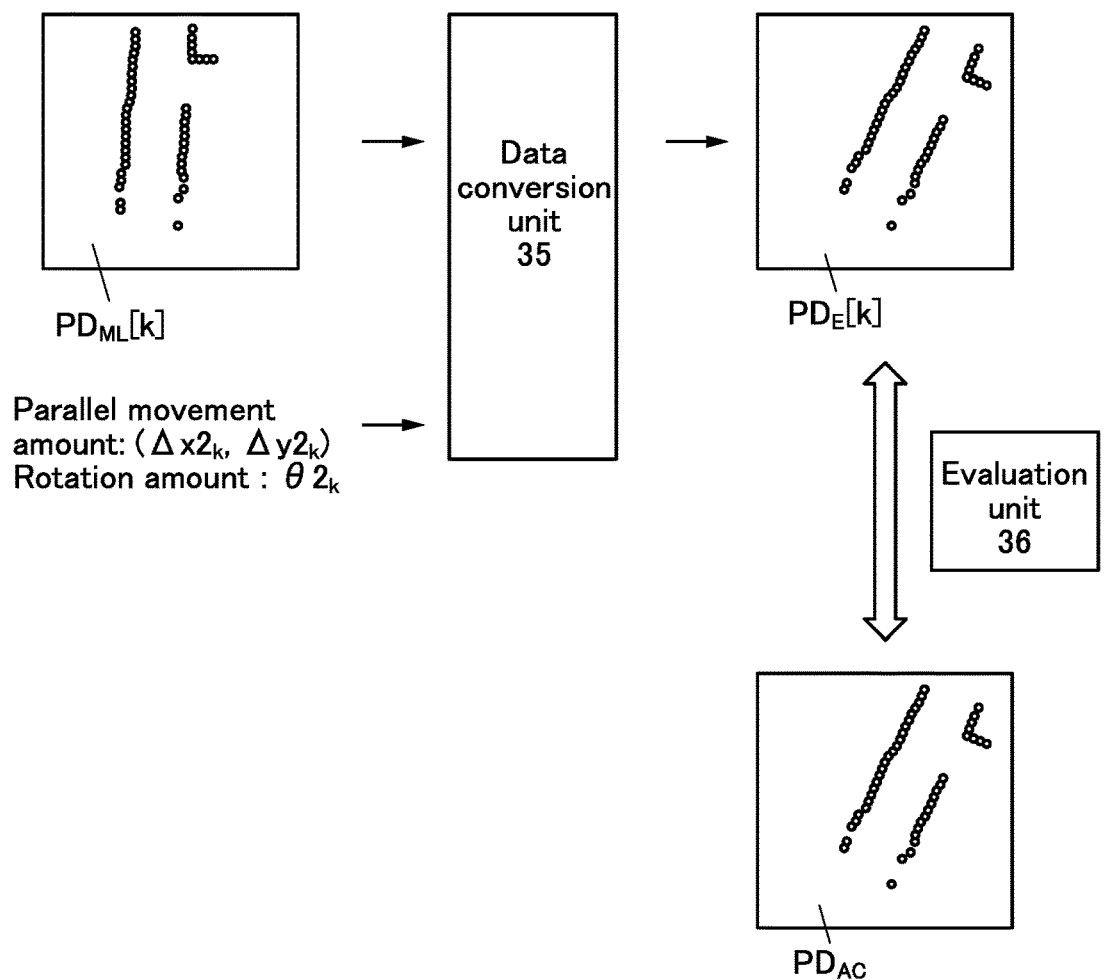

Next, the data conversion unit 35 converts machine learning point cloud data $PD_{ML}[k]$ to evaluation point cloud data $PD_E[k]$ with use of the parallel movement amount $(\Delta x2_k, \Delta y2_k)$ and the rotation amount $\theta 2_k$ (Step S15). FIG. 8B is a schematic view showing an example of the operation in Step S15 and the like. As described above, the data conversion unit 35 moves each point included in the machine learning point cloud data $PD_{ML}[k]$ in parallel by $(\Delta x2_k, \Delta y2_k)$ and rotates the point by $\theta 2_k$ thereby converting the machine learning point cloud data $PD_{ML}[k]$ to the evaluation point cloud data $PD_E[k]$.

In the specification and the like, the machine learning point cloud data $PD_{ML}[k]$ and the evaluation point cloud data $PD_E[k]$ are called data corresponding to each other.

After that, the evaluation unit 36 calculates an evaluation value representing the degree of correspondence between the acquisition point cloud data $PD_{AC}$ and the evaluation point cloud data $PD_E[k]$. Thus, the degree of correspondence between the acquisition point cloud data $PD_{AC}$ and the evaluation point cloud data $PD_E[k]$ is evaluated (Step S16). FIG. 8B also shows an example of the operation in Step S16.

As described above, the evaluation value can be calculated by a method used in scan matching, such as ICP scan matching or NDT scan matching. The evaluation of the degree of correspondence between the acquisition point cloud data $PD_{AC}$ and the evaluation point cloud data $PD_E[k]$ leads to the evaluation of the degree of correspondence between the acquisition point cloud data $PD_{AC}$ and the machine learning point cloud data $PD_{ML}[k]$. For example, a point included in one of the two types of the point cloud data is moved in parallel, or the one of the point cloud data is rotated around one point. As a result of the movement and rotation, if the one of the point cloud data corresponds to the other point cloud data, the two types of point cloud data are regarded as corresponding data.

Next, whether the number of the set value of "k" reaches the predetermined number or not is determined (Step S17). The predetermined number can be n, for example. In this case, all pieces of the machine learning point cloud data $PD_{ML}$ can be subjected to the evaluation of the correspondence degree with the acquisition point cloud data $PD_{AC}$. Furthermore, the predetermined number can be made smaller than n. In this case, the value "k" can be set so that, for example, all pieces of the machine learning point cloud data $PD_{ML}$ used in learning can be subjected to the evaluation of the correspondence with the acquisition point cloud data $PD_{AC}$.

When the number of the set value of "k" does not reach the predetermined number, the operation shown in Step S13 to Step S17 is performed again. In other words, the value of "k" is reset to have a different value, and the degree of correspondence between the acquisition point cloud data $PD_{AC}$ and the machine learning point cloud data $PD_{ML}[k]$ is evaluated.

When the number of the set value of "k" reaches the predetermined number, the evaluation unit 36 estimates the position of the position estimation device 30 (Step S18). For example, the position represented by the machine learning point cloud data $PD_{ML}$ with the highest correspondence degree with the acquisition point cloud data $PD_{AC}$ can be the position of the position estimation device 30 that acquires the acquisition point cloud data $PD_{AC}$.

Note that even when the number of the set value of "k" does not reach the predetermined number in Step 17, the degree of correspondence between the acquisition point cloud data $PD_{AC}$ and the evaluation point cloud data $PD_{E}[k]$ is higher than or equal to the threshold value, in which case the step may move on Step S18. In this case, the position represented by the evaluation point cloud data $PD_{E}[k]$ whose correspondence degree with the acquisition point cloud data $PD_{AC}$ is higher than or equal to the threshold value can be the position of the position estimation device 30.

The above is an example of the position estimation method using the position estimation system 10. With the position estimation method using the position estimation system 10, the parallel movement amount (Δx2, Δy2) and the rotation amount 92 can be calculated from the inference by the machine learning model MLM. Accordingly, as compared with the case where the parallel movement amount (Δx2, Δy2) and the rotation amount 92 are calculated without the machine learning model, the quantity of arithmetic operation by the position estimation device 30 can be reduced. Thus, the position of the position estimation device 30 can be estimated in real time, and the power consumption of the position estimation device 30 can be reduced. Furthermore, the position estimation device 30 does not necessarily include high-performance CPU, GPU, or the like, which enables the cost of the position estimation device 30 to be low.

REFERENCE NUMERALS

10: position estimation system, 20: learning device, 21: input unit, 22: point-cloud-to-image conversion unit, 23: comparison unit, 24: learning unit, 30: position estimation device, 31: data acquisition unit, 32: point cloud data acquisition unit, 33: point-cloud-to-image conversion unit, 34: inference unit, 35: data conversion unit, 36: evaluation unit, 37: laser, 38: sensor, 40: automobile, 41: battery

The invention claimed is:

1. A position estimation system comprising:
a learning device; and
a position estimation device,
the learning device comprising:
  a comparison unit; and
  a learning unit,
the position estimation device comprising:
  a data acquisition unit;
  an inference unit;
  a data conversion unit; and
  an evaluation unit,
  wherein the data acquisition unit comprises a sensor,
  wherein the comparison unit is configured to:
    select two types of machine learning data from three or more types of machine learning data representing geographic information; and
    compare the two types of machine learning data to calculate a first parallel movement amount and a first rotation amount based on Iterative Closest Point scan matching or Normal Distribution Transform scan matching,
  wherein the learning unit is configured to generate a machine learning model through learning using the two types of machine learning data as learning data, and the first parallel movement amount and the first rotation amount as correction labels,
  wherein the data acquisition unit is configured to acquire location acquisition data by observing environmental information with use of the sensor,
  wherein the inference unit is configured to infer a second parallel movement amount and a second rotation amount, with use of the machine learning model, based on the location acquisition data and one type of machine learning data selected from the three or more types of machine learning data,
  wherein the data conversion unit is configured to convert the one type of machine learning data to evaluation data based on the second parallel movement amount and the second rotation amount, and
  wherein the evaluation unit is configured to evaluate a degree of correspondence between the location acquisition data and the evaluation data.

2. A position estimation system comprising:
a learning device; and
a position estimation device,
the learning device comprising:
  a first point-cloud-to-image conversion unit;
  a comparison unit; and
  a learning unit,
the position estimation device comprising:
  a point cloud data acquisition unit;
  a second point-cloud-to-image conversion unit;
  an inference unit;
  a data conversion unit; and
  an evaluation unit,
  wherein the first point-cloud-to-image conversion unit is configured to convert n types of machine learning point cloud data representing geographic information to n types of machine learning image data,
  wherein n is an integer greater than or equal to 3, wherein the comparison unit is configured to:
  select two types of machine learning point cloud data from the n types of machine learning point cloud data; and
  compare the two types of machine learning point cloud data to calculate a first parallel movement amount and a first rotation amount based on Iterative Closest Point scan matching or Normal Distribution Transform scan matching,
wherein the learning unit is configured to generate a machine learning model through learning using two types of machine learning image data corresponding to the two types of machine learning point cloud data as learning data, and the first parallel movement amount and the first rotation amount as correction labels,
wherein the point cloud data acquisition unit is configured to acquire location acquisition point cloud data by observing environmental information,
wherein the second point-cloud-to-image conversion unit is configured to convert the location acquisition point cloud data to location acquisition image data,
wherein the inference unit is configured to infer a second parallel movement amount and a second rotation amount, with use of the machine learning model, based on the location acquisition image data and one type of machine learning image data selected from the n types of machine learning image data,
wherein the data conversion unit is configured to convert one type of machine learning point cloud data corresponding to the one type of machine learning image data to evaluation point cloud data based on the second parallel movement amount and the second rotation amount, and
wherein the evaluation unit is configured to evaluate a degree of correspondence between the location acquisition point cloud data and the evaluation point cloud data.

3. The position estimation system according to claim 2, wherein the location acquisition image data and the machine learning image data are binary data.

4. The position estimation system according to claim 1, wherein the machine learning model is a convolutional neural network model.

5. A position estimation device comprising:
a data acquisition unit;
an inference unit;
a data conversion unit and
an evaluation unit,
wherein the data acquisition unit comprises a sensor,
wherein the data acquisition unit is configured to acquire location acquisition data by observing environmental information with use of the sensor,
wherein the inference unit is configured to infer a first parallel movement amount and a first rotation amount, with use of a machine learning model, based on the location acquisition data and one type of machine learning data selected from three or more types of machine learning data representing geographic information,
wherein the machine learning model is generated through learning using:
  two types of machine learning data selected from the three or more types of machine learning data as learning data; and
  a second parallel movement amount and a second rotation amount as correction labels, the second parallel movement and the second rotation amount being calculated by comparing the two types of machine learning data,
wherein the data conversion unit is configured to convert the one type of machine learning data to evaluation data based on the first parallel movement amount and the first rotation amount, and
wherein the evaluation unit is configured to evaluate a degree of correspondence between the location acquisition data and the evaluation data.

6. The position estimation device according to claim 5, wherein the machine learning model is a convolutional neural network model.

7. The position estimation device according to claim 5, wherein the second parallel movement amount and the second rotation amount are calculated by scan matching.

8. A mobile object comprising the position estimation device according to claim 5, and a battery.

9. The mobile object according to claim 8, comprising a self-driving function.

10. The position estimation system according to claim 2, wherein the machine learning model is a convolutional neural network model.

* * * * *